US011297090B2

(12) United States Patent
dos Santos Silva et al.

(10) Patent No.: US 11,297,090 B2
(45) Date of Patent: Apr. 5, 2022

(54) SECURITY EVALUATION FOR COMPUTING WORKLOAD RELOCATION

(71) Applicant: International Business Machines Corporation, Armonk, NY (US)

(72) Inventors: Bruno dos Santos Silva, McKinney, TX (US); Ron Williams, Austin, TX (US); David Kaminsky, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 16/566,942

(22) Filed: Sep. 11, 2019

(65) Prior Publication Data
US 2021/0075815 A1    Mar. 11, 2021

(51) Int. Cl.
*H04L 29/06* (2006.01)
*G06N 3/08* (2006.01)

(52) U.S. Cl.
CPC .......... *H04L 63/1433* (2013.01); *G06N 3/08* (2013.01); *H04L 63/107* (2013.01)

(58) Field of Classification Search
CPC ... H04L 63/1433; H04L 63/107; H04L 63/20; G06N 3/08
See application file for complete search history.

(56) References Cited

U.S. PATENT DOCUMENTS

| | | | | |
|---|---|---|---|---|
| 8,478,961 B2* | 7/2013 | Bozek | ................ | G06F 9/45558 711/165 |
| 9,294,498 B1* | 3/2016 | Yampolskiy | .......... | H04L 43/065 |
| 9,424,152 B1* | 8/2016 | Raut | ................... | G06F 11/2041 |
| 2008/0046960 A1* | 2/2008 | Bade | .................... | G06F 9/4856 726/1 |
| 2010/0162036 A1* | 6/2010 | Linden | ................. | G06F 11/181 714/4.11 |
| 2016/0283713 A1 | 9/2016 | Brech et al. | | |

OTHER PUBLICATIONS

"Migrate VMware Workloads", VMware on IBM Cloud with IBM Cloud Migration Service, printed Jul. 25, 2019, © 2016 SoftLayer Technologies, 2 pages.
Crockford, "How JavaScript Works", Introducing JSON, printed Jul. 25, 2019, 5 pages https://www.json.org/.
Mell et al., "The NIST Definition of Cloud Computing", Recommendations of the National Institute of Standards and Technology, Sep. 2011, U.S. Department of Commerce, 7 pages.

* cited by examiner

*Primary Examiner* — Chau Le
(74) *Attorney, Agent, or Firm* — Scott Dobson

(57) ABSTRACT

A security incident is detected at a first location; a risk of the security incident is evaluated. A first security scores is generated for the first location. A set of security scores are generated for a set of alternative locations; the set of security scores excludes the first security score. A second security score within the set of security scores is determined to be the best security score among a plurality of security scores; the plurality of security scores comprises the set of security scores and the first security score. A workload associated with the first location is migrated to a second location, where the second location is associated with the second security score.

20 Claims, 8 Drawing Sheets

SECURITY EVALUATION FOR COMPUTING WORKLOAD RELOCATION

BACKGROUND

The present disclosure relates generally to the field of computing system security, and more particularly to relocating workloads according to security evaluations.

Cloud computing environments may include workloads sourced dynamically from varied environments, and the workloads may be hosted among various locations and/or sites which together comprise a global system. While the locations/sites may, collectively, host the same workload, the security profile of each location/site may vary.

SUMMARY

Some embodiments of the present disclosure include a method, computer program product, and system for relocating workloads according to security evaluations.

A security incident is detected at a first location; a risk of the security incident is evaluated. A first security scores is generated for the first location. A set of security scores are generated for a set of alternative locations; the set of security scores excludes the first security score. A second security score within the set of security scores is determined to be the best security score among a plurality of security scores; the plurality of security scores comprises the set of security scores and the first security score. A workload associated with the first location is migrated to a second location, where the second location is associated with the second security score.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate some embodiments of the present disclosure and, along with the description, serve to explain the principles of the disclosure. The drawings are only illustrative of typical some embodiments and do not limit the disclosure.

Figure 1:
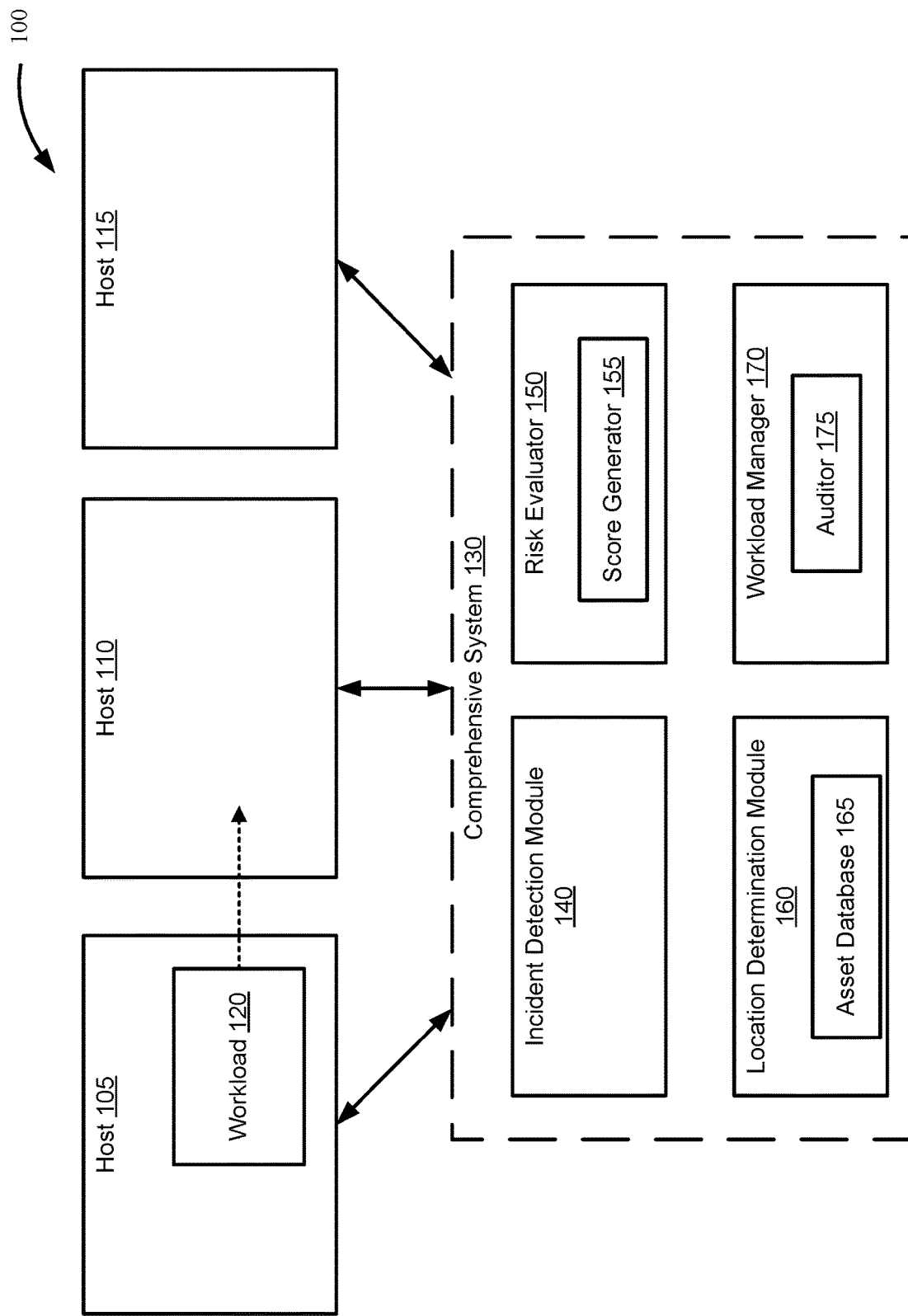
FIG. 1 illustrates a high-level block diagram of an example cloud computing environment for workload relocation, in accordance with some embodiments of the present disclosure.

While some embodiments described herein are amenable to various modifications and alternative forms, specifics thereof have been shown by way of example in the drawings and will be described in detail. That the particular some embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of computing system security, and more particularly to relocating workloads according to security evaluations. While the present disclosure is not necessarily limited to such applications, various aspects of the disclosure may be appreciated through a discussion of various examples using this context.

As cloud computing increases in popularity and use, user workloads may be sourced dynamically from varied environments, such that different hosts/sites are engaged in hosting the same content, even though each host/site may have a different set of security protocols and characteristics.

Some embodiments of the present disclosure contemplated the detection of security incidents, the evaluation of the impact of such incidents, an evaluation of the security profile(s) of the various hosts, the migration of workloads to the most desirable host, and auditing services.

In some embodiments, an example of a comprehensive security system may include an incident detection module, a risk evaluator, a location determination module, and a workload manager. The incident detection module may detect, identify, and correlate security events for a plurality of hosts (e.g., locations hosting servers employed as hypervisors running virtual machines in a cloud computing environment). The incident detection module may take some actions, including the generation of alerts, logging events for auditing purposes, supplying real-time controls to an administrator, blocking network traffic or program functions, etc. The incident detection module may be a single system, such as an in-line network protection appliance, or it may include a Security Information and Event Monitor (SIEM) that generates alerts based on a set of policies (e.g., rule-based alerting).

A risk evaluator may receive information from the incident detection module to evaluate the perceived business impact of a security incident (e.g., a risk score). The risk evaluator may collect, passively or actively, a set of Common Vulnerability Exposure (CVE) factors. CVE factors may include, for example, program signatures, Operating System (OS) signatures, traffic signatures, network threat signatures, endpoint reputations, human developed threat intelligence containing actionable indicators, etc. The risk evaluator may compile the CVE factors with the information received from the incident detection module and compare it against an asset database. The asset database may include information regarding the deployed applications, servers, platforms, computing devices and/or modules, etc. employed in a cloud computing environment or a set of cloud computing environments. In some embodiments, the asset database may include information regarding hosts' and/or virtual machines' OS, ports, patch version, etc.

The risk evaluator may further employ a score generator to both evaluate the business impact of a security incident and to generate a security score for one or more hosts/sites/locations.

In some embodiments where multiple security incidents are at play, the business impact/risk score may be utilized to rank the incidents within a queue. In this way, the security incidents may be prioritized according to perceived business impact.

A location determination module may receive the information compiled by the risk evaluator, according to the incident prioritization. As the information is received, the location determination module may generate security scores for other available hosts/sites/locations within the cloud computing environment, or set of cloud computing environments. The location determination module may employ the same, or similar, score generator and asset database as the risk evaluator. The location determination module may compare the scores of all available hosts/sites/locations to determine whether an alternate host would provide better security against a particular incident. If so, the location determination module may signal a workload manager to migrate the affected workload. In some embodiments, any number of workloads at the affected site may be migrated and updates/patches or other security fixes may be applied to the affected host.

The workload manager may migrate workloads using either hot or cold migrations. The workload manager may employ an auditor to ensure that the migration was successful, and to ensure that no trace of the workload remains in the memory or storage of the affected host. In some embodiments, the auditor may additionally execute measures to ensure no additional code (e.g., viruses, worms, trojans, other security threats) is transferred along with the original workload. In some embodiments, a migration log may be compiled for the purposes of performing such an audit.

FIG. 1, illustrates a high-level block diagram of an example cloud computing environment 100 for workload relocation, in accordance with some embodiments of the present disclosure. The components of FIG. 1 are amenable to various modifications and alternative forms, and therefore, the particular some embodiments described are not to be taken in a limiting sense.

Cloud computing environment 100 may include, for example, host 105, host 110, host 115, and comprehensive system 130. Hosts 105, 110, and 115 may represent location/sites with physical computing components (e.g., servers and other computing devices) that provide the physical bases for creating and running virtual machines to provide cloud computing services. Cloud computing and cloud computing services are described in greater detail with regards to FIGS. 5 and 6.

In some embodiments, host 105 may include a workload 120. Depending on the type and purpose of the example cloud computing environment 100, workload 120 may include an OS, a particular program, object storage, a virtual machine, etc. Hosts 105, 110, and 115 may include a plurality of workloads (not pictured).

Comprehensive system 130 may further include an incident detection module 140, risk evaluator 150, location determination module 160, and workload manager 170. Comprehensive system 130 may be contained in a single computing device, or the various components of comprehensive system 130 may be distributed across a plurality of devices.

As described herein, incident detection module 140 may include an inline network protection appliance or an SIEM.

In some embodiments, incident detection module 140 may detect security incidents at hosts 105, 110, and 115. Incident detection module 140 may identify and correlate one or more security incidents affecting one or more of hosts 105, 110, and 115. Incident detection module 140 may take various actions, such as generating alerts to users and/or administrators, logging events (e.g., network traffic, Internet Protocol (IP) addresses clients, etc.), supplying real-time controls (e.g., employing a firewall, blocking connection ports altogether, employing Medium Access Control (MAC) address filtration and/or IP address filtration, initiating dual-factor authentication procedures, etc.) to manage, mitigate, and remedy security incidents, if possible.

In some embodiments, risk evaluator 150 may include a score generator 155. As described herein, risk evaluator 150 may receive information regarding a security incident from incident detection module 140. The information may be used to evaluate a security risk (e.g., generate a risk score) for the security incident. The risk score may represent the perceived business impact of the security incident. In some embodiments, the risk score may be generated by inputting a set of CVE factors into a neural network to receive a risk score. In some embodiments, a user may be presented with a set of risk scores and/or security scores from which the user may select for training purposes. In such some embodiments, the user's input may be used to adjust and/or train a neural network's biases and/or weights to more accurately generate risk scores and/or security scores In some embodiments, score generator 155 may include one or more neural networks for the generation of risk scores and security scores, as described herein. Score generator 155 may, in some embodiments, be a component of risk evaluator 150, a component of another section of comprehensive system 130, or it may be a standalone component. Security scores may be generated using the set of CVE factors and an asset database 165.

In some embodiments, asset database 165 may be a component of the location determination module 160, a component of another section of comprehensive system 130, or it may be a standalone component. Asset database 165 may include, for example, a comprehensive listing of the computing devices and equipment deployed across hosts 105, 110, and 115. Asset database 165 may further include characteristics of the computing devices of hosts 105, 110, and 115 (e.g., OS versions, patch versions, physical security features, security programs, etc.).

In some embodiments, risk evaluator 150 may generate a risk score for a particular host in response to the detection of a security incident by incident detection module 140. In some embodiments, risk evaluator 150 may also generate a security score for the host affected by the security incident and pass the scores to the location determination module 160.

In some embodiments, location determination module 160 may determine a set of security scores for the available hosts (e.g., the hosts not affected by the security incident which also have the resources available to accommodate one or more workloads on the affected host). In some embodiments, location determination module 160 and risk evaluator 150 may calculate their respective security scores for multiple hosts concurrently using parallelism techniques, such as Single Instruction Multiple Data (SIMD) techniques.

Location determination module 160 may compare the security score of the affected host and the set of security scores for the available hosts (collectively, a plurality of security scores) to determine which host provides the best security. In some embodiments, the determination of "best"

may include "best overall," or it may be directed to "best against the security incident at hand." If location determination module 160 determines that an unaffected host (e.g., an alternate host) provides the best security, then workload manage 170 may be alerted to migrate the affected workload (e.g., workload 120). In this example, host 110 is depicted as having the "best" security score.

In some embodiments, workload manager 170 may execute a migration using hot or cold migration techniques. Workload manager 170 may, in some embodiments, instruct an affected host to begin implementing security measures (e.g., applying patches/fixes, powering down, blocking ports, etc.) once the migration is complete. In some embodiments, workload manager 170 may include an auditor 175. In some embodiments, auditor 175 may be a standalone component, or it may be a subcomponent of another section of comprehensive system 130.

Auditor 175 may receive logs from any or all of incident detection module 140, risk evaluator 150, location determination module 160, workload manager 170, and hosts 105, 110, and 115. Auditor 175 may analyze the logs (e.g., migration logs) to determine whether a workload, such as workload 120 has been successfully migrated, as well as to ensure that no trace of workload 120 remains on host 105 after the migration, and to ensure that the migration of workload 120 did not carry over any security risks to host 110.

Figure 2:
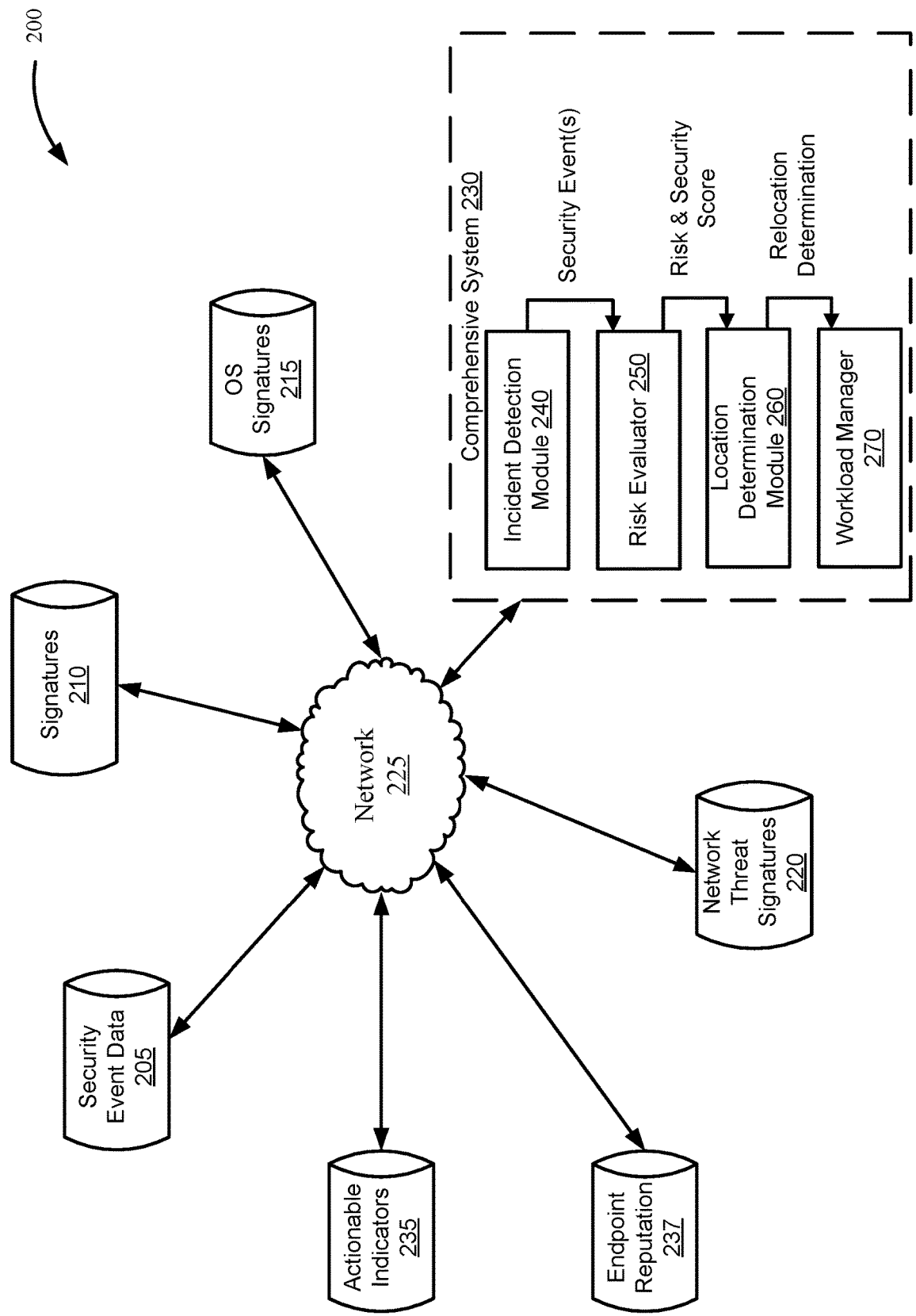
FIG. 2 illustrates an example of a networking environment for a comprehensive system, in accordance with some embodiments of the present disclosure.

Referring now to FIG. 2, illustrated is an example of a networking environment 200 for a comprehensive system 230, in accordance with some embodiments of the present disclosure. Networking environment 200 may include a number of data sources for security event data 205, signatures 210, OS signatures 215, network threat signatures 220, endpoint reputation data 237, and actionable indicators 235. Networking environment 200 may further include network 225 and comprehensive system 230. In certain some embodiments, the data sources may reside in the storage of a single device, or may be distributed across the storage of a plurality of devices. Data collected from the data sources may include historical data or real-time data. In some embodiments, a single type of data (e.g., endpoint reputation data 237) may reside in the storage of a single device, or may reside in the storage of several devices connected either locally or remotely via a network, such as network 225. In some embodiments, the data sources and other devices connected to network 225 may be local to each other and communicate via any appropriate local communication medium.

In some embodiments, network 225 can be implemented using any number of any suitable communications media. For example, the network 225 may be a wide area network (WAN), a local area network (LAN), an internet, or an intranet. For example, the comprehensive system 230 and one or more data sources may communicate using a local area network (LAN), one or more hardwire connections, a wireless link or router, or an intranet. In some embodiments, the comprehensive system 230 and one or more data sources may be communicatively coupled using a combination of one or more networks and/or one or more local connections.

In some embodiments, the network 225 can be implemented within a cloud computing environment or using one or more cloud computing services. Consistent with various some embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 225.

The various data sources (e.g., security event data 205, signatures 210, OS signatures 215, network threat signatures 220, endpoint reputation data 237, and actionable indicators 235) may include data necessary for the generation of risk scores and security scores. Each data source may represent a single repository of information, or it may represent multiple characteristics and/or storage modules of a plurality of computing devices or virtual machines.

Security event data 205 may include, for example, event data and log data relevant to the detection, identification, and classification of security incidents and threats (e.g., unauthorized intrusions, data breaches, data misuse, malicious activities, and other cyber threats) within, for example, a cloud computing environment. Security data 205 may include other data relevant to the evaluation of risk scores and security scores not found in the following data sources.

Signatures 210 may include, for example, "fingerprints" for applications, services, etc. which may be used to determine the number and type of applications, programs, etc. running on a host/location or as part of a particular workload.

OS signatures 215 may include, for example, "fingerprints" which may be used to determine the number and type of OS running on a host or as part of a workload.

Network threat signatures 220 may include, for example, a set of network behaviors and/or events that, grouped together, may classify an intrusion attempt or other threat propagated with the use of a network. For example, it may include multiple consecutive failed logon attempts from a single IP address where each attempt uses a password with only one character's difference (e.g., a brute-force method).

Endpoint reputation data 237 may include, for example, historical information regarding a particular location/host or access point. In some embodiments, locations that are more frequently subjected to threats and/or security incidents may incur a reduction in endpoint reputation to reflect the increased risk associated with a greater number of threats/incidents.

Actionable indicators 235 may include, for example, pieces of data, such as those in log entries, that may imply potentially malicious activities on a system or network. Actionable indicators 235 may further include the availability or pendency of security updates/patches that have yet to be implemented.

Comprehensive system 230 may the same, or substantially similar to, comprehensive system 130 of FIG. 1. Comprehensive system 230 may include an incident detection module 240 (e.g., the same, or substantially similar to, incident detection module 140 of FIG. 1), a risk evaluator 250 (e.g., the same, or substantially similar to, risk evaluator 150 of FIG. 1), a location determination module 260 (e.g., the same, or substantially similar to, location determination module 160 of FIG. 1), and workload manager 270 (e.g., the same, or substantially similar to, workload manager 170 of FIG. 1).

In some embodiments, incident detection module 240 may detect, identify, and correlate security events and pass this information to risk evaluator 250. Risk evaluator 250 may then consider CVE factors gathered from one or more data sources to generate a risk score for the incident, as well as a security score for the affected host or location. Location determination module 260 may further generate security scores for alternate locations/hosts and determine which location/host is "best." If an alternate location is best, a relocation determination may be sent to workload manager 270. Workload manager 270 may cause the workload(s) of the affected location to be transferred to the "best" location.

In some embodiments, the "best" location may have limited capacity and be unable to accommodate a plurality of affected workloads. As the "best" location reaches capacity, it may be removed from consideration, and a new "best" location determination may be performed.

Figure 3A:
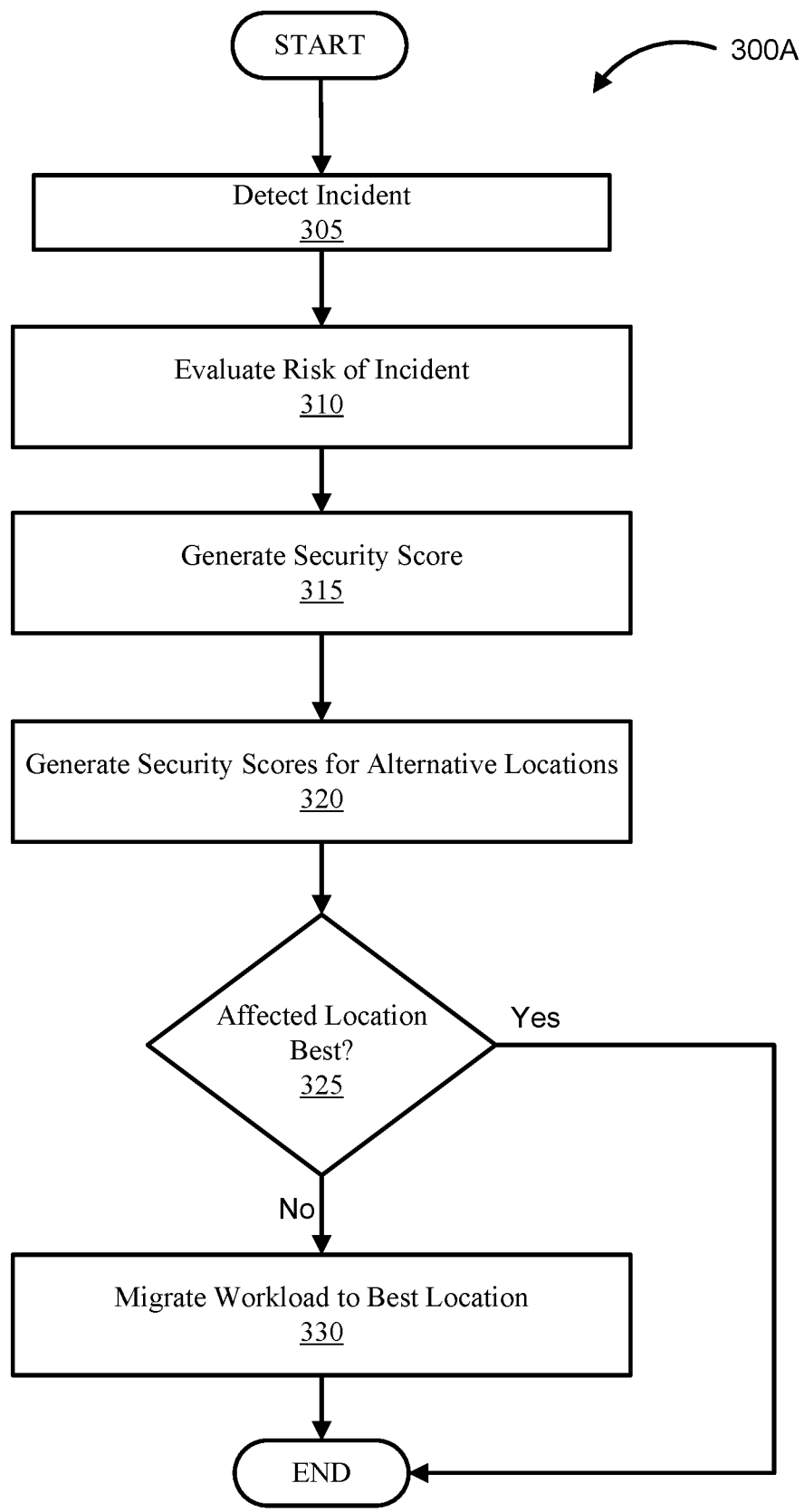
FIG. 3A illustrates a flowchart of a method for migrating a workload according to a security evaluation, in accordance with some embodiments of the present disclosure.

Referring now to FIG. 3A, illustrated is a flowchart of a method 300A for migrating a workload according to a security evaluation, in accordance with some embodiments of the present disclosure. Method 300A may begin at 305 with the detection of a security incident. In some embodiments, a detection of a security incident may include a prediction of a security incident prior to the security incident taking place. In other embodiments, a security incident may include a determination or prediction that the location hosting a workload is less secure than an alternate location, and therefore presents an increased risk. In yet other embodiments, a security incident may include, for example, an intrusion attempt, deployment of ransomware, deployment of malware, deployment of spyware, phishing attempts, receipt of e-mails or messages associated with social engineering attacks, attempts to exploit weaknesses in a firewall or OS, denial of service attacks (regular and distributed), backdoor creation attempts, abuse of privileges by an otherwise authorized user, equipment failure, application failure, power fluctuations, e-mail address spoofing, and any other event that may exploit, exacerbate, or create a security vulnerability. The security incident may be detected, for example, by incident detection module 140.

At 310, the risk associated with the security incident is evaluated. The evaluation may include both the risk to the physical/virtual components as well as the impact to a targeted business. Business impacts may include, for example, lost revenue, lost access to resources, lost data, data breaches, legal liability, loss of reputation, decreased ability to provide services to third parties, etc. The risk evaluation may be performed by, for example, risk evaluator 150 of FIG. 1.

At 315, a security score is generated. As described herein, a security score may include an evaluation of the risk score with additional consideration for CVE factors. The security score may further include consideration of information contained in an asset database, and it may be tailored to the location of the security incident.

At 320, security scores for alternative locations may be generated. As described herein, alternate locations/hosts may be evaluated and security scores may be generated for the alternate locations, using the CVE factors and asset database. In some embodiments, this may be performed by location determination module 160 of FIG. 1. In some embodiments, the security scores for the locations (including some or all of the alternative locations and the affected location) may be generated prior to the detection of an incident. In such some embodiments, the security scores may be stored in a secured/encrypted location (e.g., an encrypted storage device, a blockchain ledger, etc.) and updated concurrently with any applied patches or other changes that may affect a given security score. In some embodiments, stored and/or pre-calculated security scores may be updated "on-the-fly" as security incidents are detected to account for any impact the security incident(s) may have on the security score(s).

At 325, it is determined which location of all the locations is best. The determination may be executed by comparing the security scores for each location. In some embodiments, this may be a general security score, or it may be a specialized security score for the particular security incident detected. If the location/host affected by the security incident is already associated with the best security score, the method may end.

If, however, the current location is not associated with the best security score at 325, the workload(s) associated with the affected location may be migrated to the location associated with the best security score. In some embodiments, this may be performed by workload manager 170 of FIG. 1.

Figure 3B:
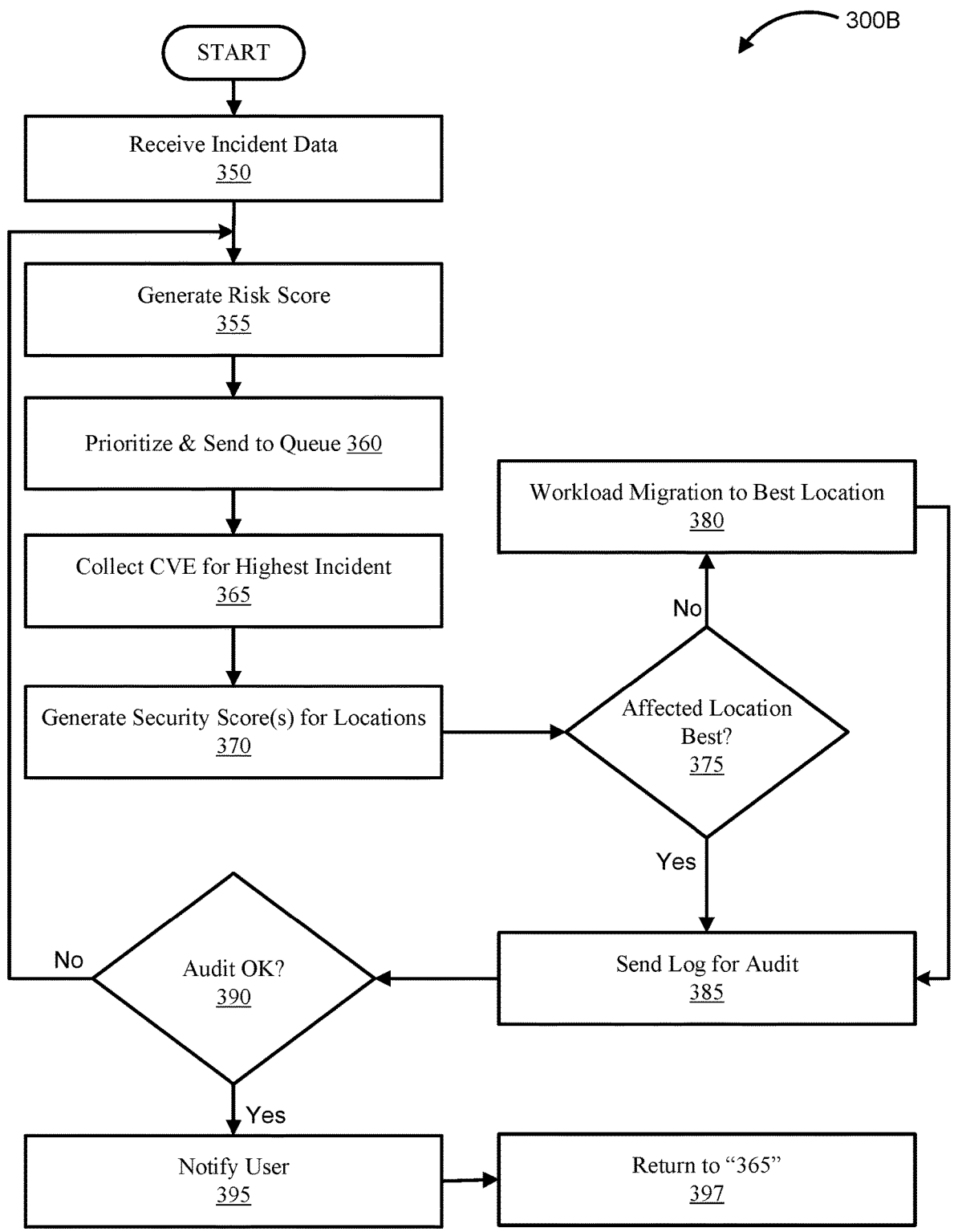
FIG. 3B illustrates a flowchart of a method for generating risk scores, security scores, and performing migration audits, in accordance with some embodiments of the present disclosure.

Turning now to FIG. 3B, illustrated is a method 300B for generating risk scores, security scores, and performing migration audits, in accordance with some embodiments of the present disclosure. Method 300B may be incorporated and/or overlap with method 300A at various steps. Method 300B may begin at 350, where data associated with a security incident is received. In some embodiments, this data may include a JavaScript Object Notation (JSON) string sent to a risk evaluator.

An example of such a JSON string may include:

```
{
"incidents":
    {
        "id": 001,
        "name": "First Incident",
        "source": "source ip",
        "details":
            [
                { "source ip": "1.1.1.1", "destination ip": "2.2.2.2", "OS": "Windows", "CVE": "11111-2222", "Risk Score": "500", "detected by": "IPS"}
            ]
    }
}
```

At 355, the risk score may be generated. In some embodiments, a PYTHON code element can be used to transmit this information to an API endpoint of the risk evaluator. The code may be similar to that used below (but any language of choice may be substituted, and any JSON messages discussed here may be passed using the same method):

```
import os
import sys
import json
```

```
import requests
data = {
    "incidents":
        {
            "id": 001,
        "name": "First Incident",
        "source": "source ip",
        "details":
            [
                { "source ip": "1.1.1.1", "destination ip": "2.2.2.2", "OS": "Windows", "CVE":
"11111-2222", "Risk Score": "500", "detected by": "IPS"}
            ]
        }
}
url = "https//some.url.com/api"
r = requests.post (url, header={authentication:[username.password], params={ }, json=data}
```

As discussed herein, multiple risk scores may be generated and prioritized to a queue, according to some embodiments, at 360. Risk scores may be generated as described herein. Examples of code for the creation of priorities, the creation of JSON messages, and a function to send a message to a queue may include:

```
"'function to create priority below'"
def create_prio(data):
    for each in data['incidents']['details']:
        if not each['Risk Score'] == 0:
            priority = each['Risk Score']
            return priority
        else:
            break
"'function to create JSON message
this format can be any format that the platform
desires'"
def create_message( ):
    p = create_prio(data)
    "'message to queue crafted below:'"
    msg = { "name": data['incidents']['name'],
            "incident id": data['incidents']['id'],
            "priority": p,
            "source": data['incidents'] ['source'],
            "details":data['incidents'] ['details']}
"'function to send message to queue'"
def send_to_queue(address, port):
    message = create_message( )
    HOST = address
    PORT = port
    s = socket.socket(socket.AF_INET, socket.SOCK_STREAM)
    s.connect((HOST, PORT))
    s.sendall(message)
    s.close( )
```

A queue may receive the above messages in a listener and use the following examples of code to send information about security incidents to a location determination module, such as location determination module 160 of FIG. 1, according to the security incidents' respective priority:

```
import socket
import json
import requests
class PriorityQueue(object):
    def __init__(self):
        self.queue = [ ]
    def __str__(self):
        return ' '.join([str(i) for i in self.queue])
    # for checking if the queue is empty
    def isEmpty(self):
        return len(self.queue) == [ ]
    # for inserting an element in the queue
    def insert(self, data):
        self.queue.append(data)
    # for popping an element based on Priority
    def delete(self):
        try:
            max = 0
            for i in range(len(self.queue)):
                if self.queue[i] > self.queue[max]:
                    max = i
            item = self.queue[max]
            del self.queue[max]
            return item
        except IndexError:
            print( )
            exit( )
'''executes vulnerability scanner with a POST using the requests library'''
def vuln_scan(criteria):
    params = { }
    header = {api_user:api_passwd}
    if criteria in (eve,os):
        crit = criteria
        r = requests.post('scanner',header=header params=params, json=crit)
'''processes message and execute action, in this case, a vulnerability scanner'''
def process_data(message):
    msg = message
    for each in message['incidents']['details']:
        if each['CVE'] == True:
            cve = each['CVE']
            vuln_scan(cve)
        else:
            break
'''parses priority and puts message in line for queue'''
def parse_priority(message):
    msg = message
    myQueue = PriorityQueue( )
    myQueue.insert(msg['priority'])
    while not myQueue.isEmpty( ):
        print(myQueue.delete( ))
        p = process_data(msg)
'''function that listens for queue and calls to define priority in the queue'''
def main( ):
    HOST = ''
    PORT = 50007
    s = socket.socket(socket.AF_INET, socket.SOCK_STREAM)
    s.bind((HOST, PORT))
    s.listen(1)
    conn, addr = s.accept( )
    print 'Connected by', addr
    while 1:
        data = conn.recv(1024)
        if not data:
            break
        else:
            parse_priority(data)
            conn.sendall(data)
    conn.close( )
if __name__ == '__main__':
    main( )
```

At 365, a vulnerability scanner (e.g., location determination module) may collect CVE factors for all locations, according to the security incident with the highest priority in the queue.

At 370, a plurality of security scores for the locations is generated. In some embodiments, this may be performed using a neural network, such as the neural network described in greater detail in FIG. 4. In other some embodiments, the security score may be generated procedurally. For example, each location may start with a security score of 0. As the vulnerability scanner detects potential security risks, the score may adjust by 1 per potential security risk. In some embodiments, the score value of a particular security risk may be weighted. For example, if the same security risk that caused the security incident is found in an alternate location, it may automatically adjust the alternate location's security score by the same value of the affected location's total security score. In this way, it may be ensured that a workload is not migrated to an alternate location with a "worse" security score than the affected location.

An example of code for such an embodiment may include:

```
risk == data['risk score']
score == 0
if risk == true:
  score = score + risk
  for each vulnerability in scanner:
    score = score + 1
  return score
```

At 375, it is determined whether the affected location has the best security score. This may include a direct comparison of security scores to rank the available locations.

If, at 375, it is determined the affected location does not have the best security score, the workload(s) for the affected location may be migrated to the alternate location with the best security score at 380. In some embodiments, a workload manager, such as workload manager 170 of FIG. 1, may perform the migration and create a migration for later audit.

Once the migration of 380 has begun, or if the affected location is determined to have the best security score at 375, a migration security log may be sent to an auditor for audit. In some embodiments, an auditor may analyze the logged events to determine if any errors or inconsistencies may have affected the risk score generation, security score generation, or migration processes (e.g., if a set of security criteria have been met).

If, at 390, it is determined the security criteria have been met, the user(s) responsible for the affected location(s) and workload(s) may be notified. If, however, the audit determines one or more security criteria have not been met at 390, the migration may be canceled, and the method may return to 355 to regenerate the risk score and attempt to rectify the failed audit.

Once the user(s) have been notified at 395, the method may return to 365 where the set of CVE factors for the security incident with the highest priority in the queue are collected.

Figure 4:
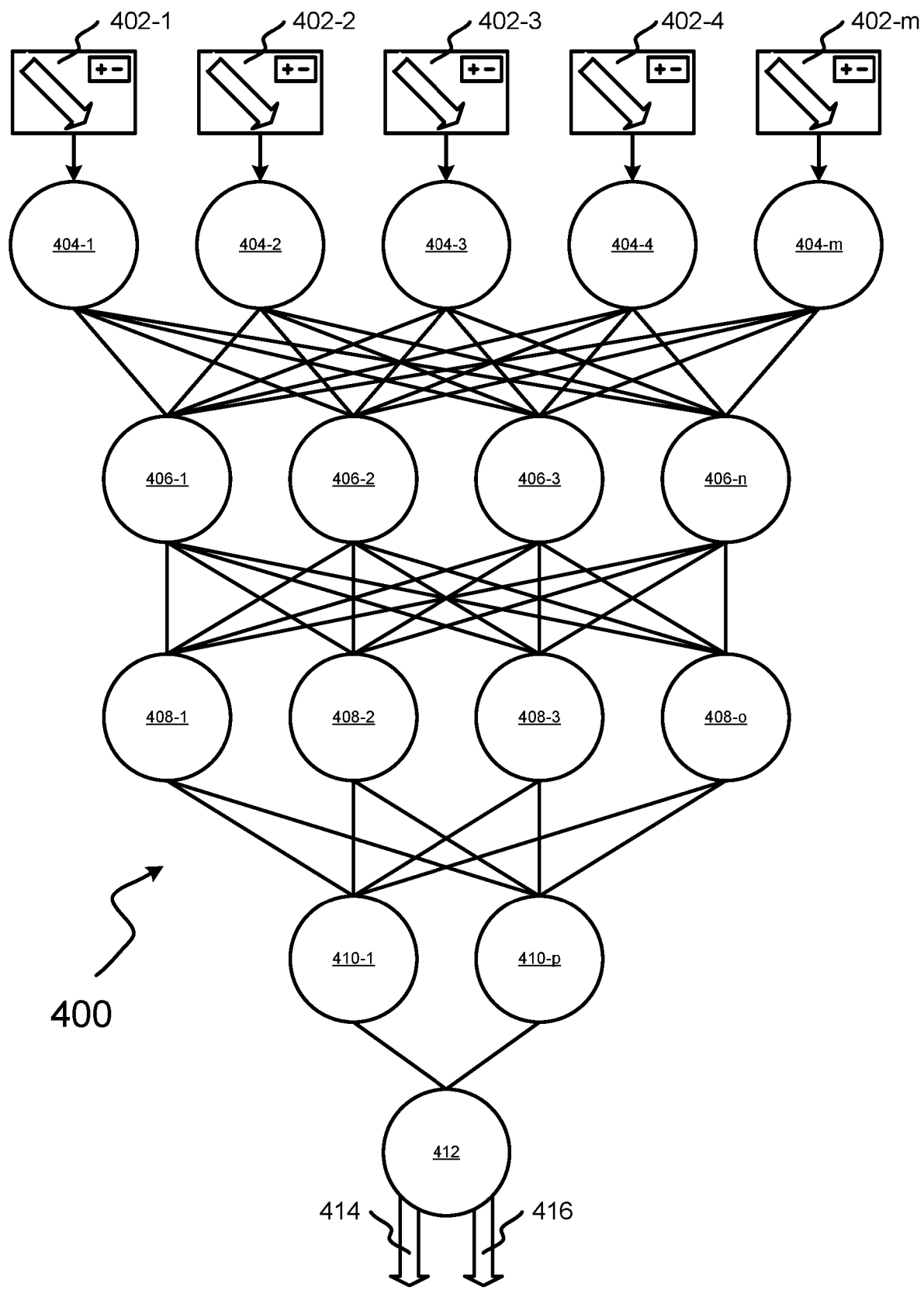
FIG. 4 illustrates an example neural network that may be specialized to generate risk scores and/or security scores, in accordance with some embodiments of the present disclosure.

FIG. 4 depicts an example neural network 400 that may be specialized to generate risk scores and/or security scores. Inputs may include, for example, security incident information, CVE factors, and data included in an asset database, as described herein. In some embodiments, neural network 400 may be a classifier-type neural network. Neural network 400 may be part of a larger neural network. For example, neural network 400 may be nested within a single, larger neural network, connected to several other neural networks, or connected to several other neural networks as part of an overall aggregate neural network.

Inputs 402-1 through 402-m represent the inputs to neural network 400. In this embodiment, 402-1 through 402-m do not represent different inputs. Rather, 402-1 through 402-m represent the same input that is sent to each first-layer neuron (neurons 404-1 through 404-m) in neural network 400. In some embodiments, the number of inputs 402-1 through 402-m (i.e., the number represented by m) may equal (and thus be determined by) the number of first-layer neurons in the network. In other some embodiments, neural network 400 may incorporate 1 or more bias neurons in the first layer, in which case the number of inputs 402-1 through 402-m may equal the number of first-layer neurons in the network minus the number of first-layer bias neurons. In some embodiments, a single input (e.g., input 402-1) may be input into the neural network. In such an embodiment, the first layer of the neural network may comprise a single neuron, which may propagate the input to the second layer of neurons.

Inputs 402-1 through 402-m may comprise one or more factors for generating a risk score or a security score. For example, inputs 402-1 through 402-m may comprise 10 CVE factors, or 10 network threat signatures. In other some embodiments, not all factors may be input into neural network 400 (e.g., when a security score is pre-calculated without information regarding a security incident).

Neural network 400 may comprise 5 layers of neurons (referred to as layers 404, 406, 408, 410, and 412, respectively corresponding to illustrated nodes 404-1 to 404-m, nodes 406-1 to 406-n, nodes 408-1 to 408-o, nodes 410-1 to 410-p, and node 412). In some embodiments, neural network 400 may have more than 5 layers or fewer than 5 layers. These 5 layers may each be comprised of the same number of neurons as any other layer, more neurons than any other layer, fewer neurons than any other layer, or more neurons than some layers and fewer neurons than other layers. In this embodiment, layer 412 is treated as the output layer. Layer 412 outputs a probability that a target event will occur, and contains only one neuron (neuron 412). In other some embodiments, layer 412 may contain more than 1 neuron. In this illustration no bias neurons are shown in neural network 400. However, in some embodiments each layer in neural network 400 may contain one or more bias neurons.

Layers 404-412 may each comprise an activation function. The activation function utilized may be, for example, a rectified linear unit (ReLU) function, a SoftPlus function, a Soft step function, or others. Each layer may use the same activation function, but may also transform the input or output of the layer independently of or dependent upon the ReLU function. For example, layer 404 may be a "dropout" layer, which may process the input of the previous layer (here, the inputs) with some neurons removed from processing. This may help to average the data, and can prevent overspecialization of a neural network to one set of data or several sets of similar data. Dropout layers may also help to prepare the data for "dense" layers. Layer 406, for example, may be a dense layer. In this example, the dense layer may process and reduce the dimensions of the feature vector (e.g., the vector portion of inputs 402-1 through 402-m) to eliminate data that is not contributing to the prediction. As a further example, layer 408 may be a "batch normalization" layer. Batch normalization may be used to normalize the outputs of the batch-normalization layer to accelerate learning in the neural network. Layer 410 may be any of a dropout, hidden, or batch-normalization layer. Note that these layers are examples. In other some embodiments, any of layers 404 through 410 may be any of dropout, hidden, or batch-normalization layers. This is also true in some embodiments with more layers than are illustrated here, or fewer layers.

Layer 412 is the output layer. In this embodiment, neuron 412 produces outputs 414 and 416. Outputs 414 and 416 represent complementary probabilities that a target event will or will not occur. For example, output 414 may represent the probability that a target event will occur, and output 416 may represent the probability that a target event will not occur. In some embodiments, outputs 414 and 416 may each be between 0.0 and 1.0, and may add up to 1.0. In such some embodiments, a probability of 1.0 may represent a projected absolute certainty (e.g., if output 414 were 1.0, the projected chance that the target event would occur would be 100%, whereas if output 416 were 1.0, the projected chance that the target event would not occur would be 100%).

In some embodiments, FIG. 4 illustrates an example probability-generator neural network with one pattern-recognizer pathway (e.g., a pathway of neurons that processes one set of inputs and analyzes those inputs based on recognized patterns, and produces one set of outputs. However, some embodiments may incorporate a probability-generator neural network that may comprise multiple pattern-recognizer pathways and multiple sets of inputs. In some of these some embodiments, the multiple pattern-recognizer pathways may be separate throughout the first several layers of neurons, but may merge with another pattern-recognizer pathway after several layers. In such some embodiments, the multiple inputs may merge as well (e.g., several smaller vectors may merge to create one vector). This merger may increase the ability to identify correlations in the patterns identified among different inputs, as well as eliminate data that does not appear to be relevant.

In some embodiments, neural network 400 may be trained/adjusted (e.g., biases and weights among nodes may be calibrated) by inputting feedback and/or input from a user to correct/force the neural network to arrive at an expected output. In some embodiments, the impact of the feedback on the weights and biases may lessen over time, in order to correct for inconsistencies among user(s). In some embodiments, the degradation of the impact may be implemented using a half-life (e.g., the impact degrades by 50% for every time interval of X that has passed) or similar model (e.g., a quarter-life, three-quarter-life, etc.).

It is to be understood that although this disclosure includes a detailed description on cloud computing, implementation of the teachings recited herein are not limited to a cloud computing environment. Rather, some embodiments of the present invention are capable of being implemented in conjunction with any other type of computing environment now known or later developed.

Cloud computing is a model of service deliver for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
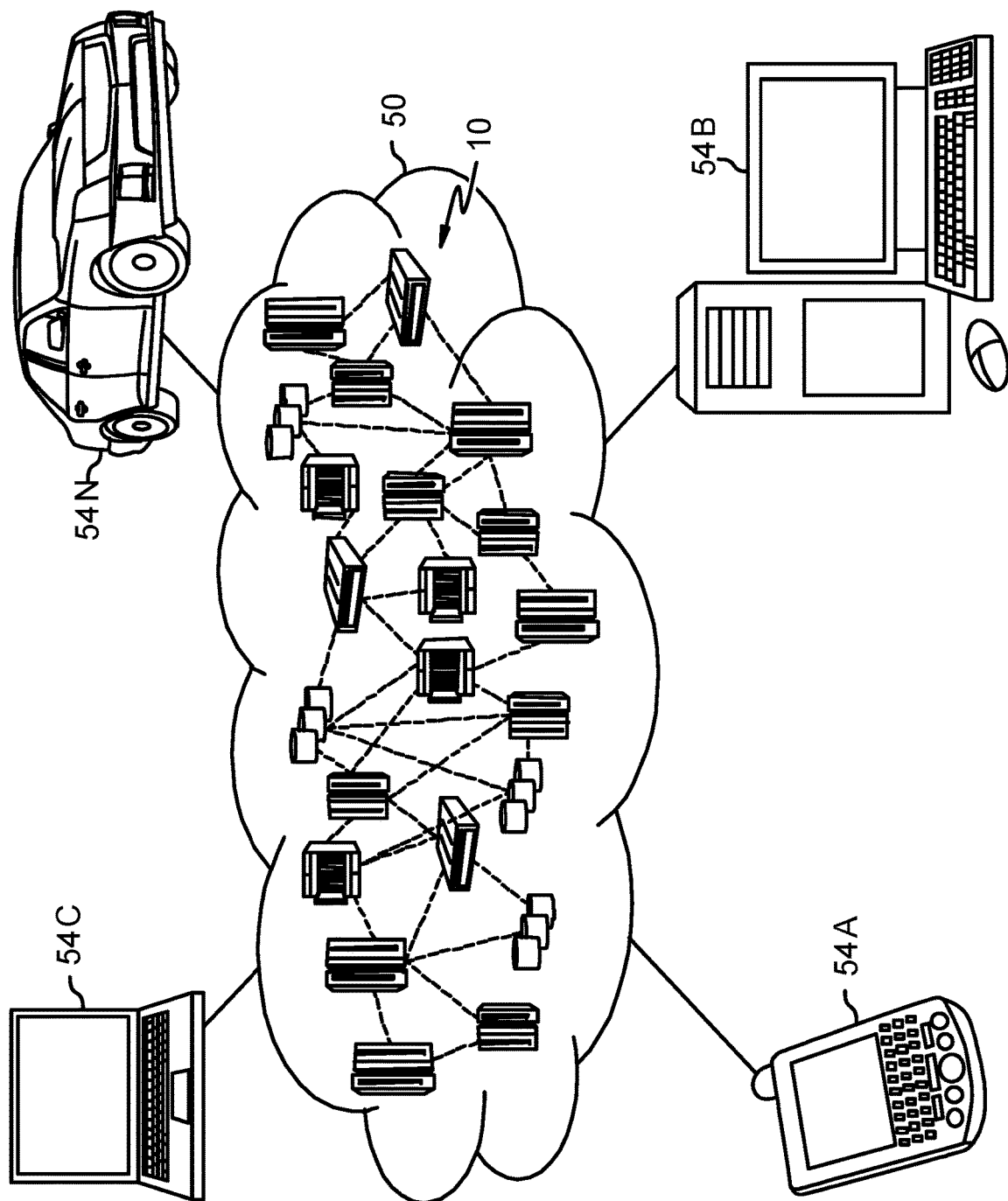
FIG. 5 depicts a cloud computing environment according to an embodiment of the present disclosure.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
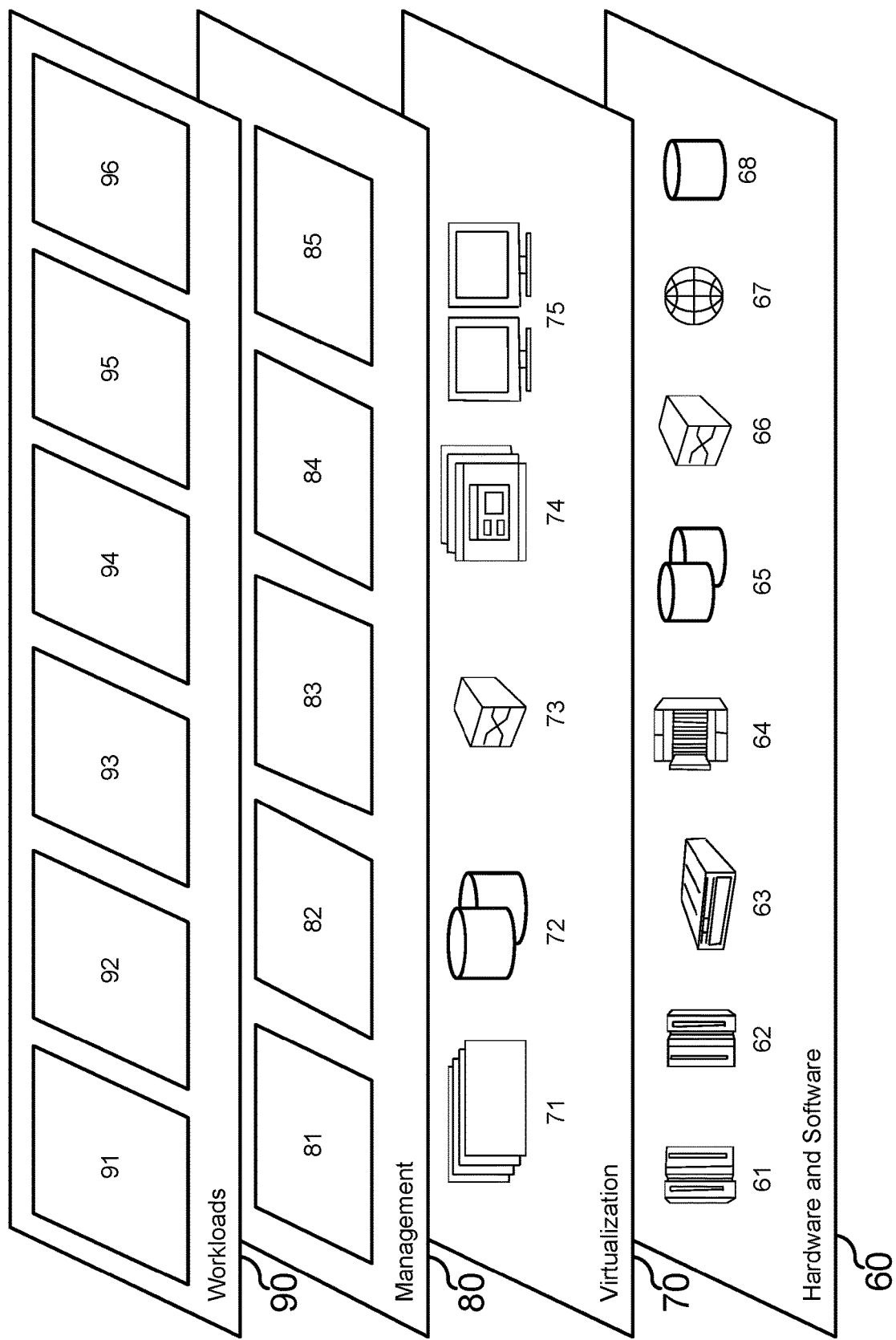
FIG. 6 depicts abstraction model layers according to an embodiment of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and some embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and relocating workloads according to security evaluations 96.

Figure 7:
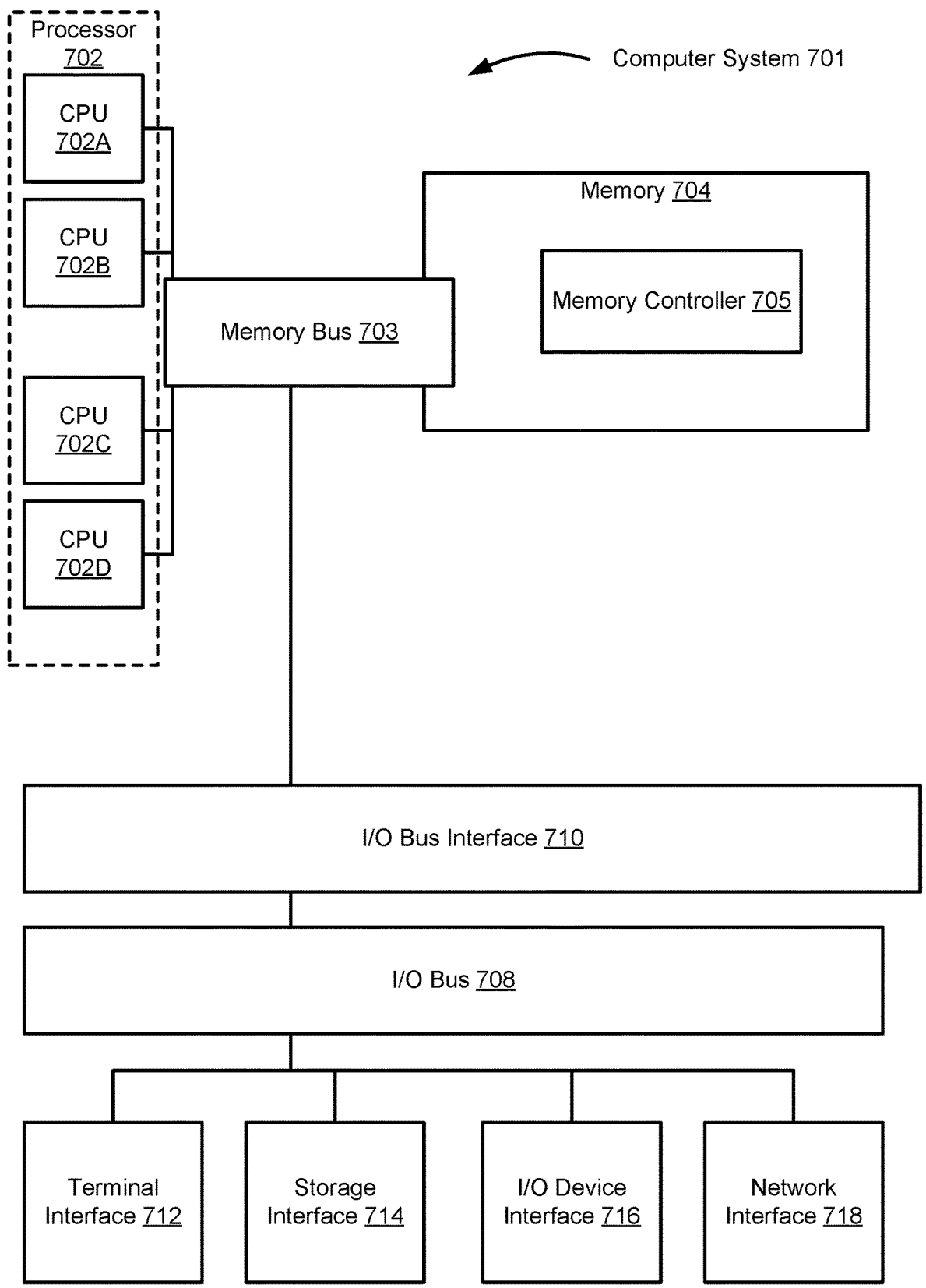
FIG. 7 illustrates a high-level block diagram of an example computer system that may be used in implementing some embodiments of the present disclosure.

Referring now to FIG. 7, shown is a high-level block diagram of an example computer system 701 that may be configured to perform various aspects of the present disclosure, including, for example, methods 300A & 300B, described in FIGS. 3A and 3B, respectively. The example computer system 701 may be used in implementing one or more of the methods or modules, and any related functions or operations, described herein (e.g., using one or more processor circuits or computer processors of the computer), in accordance with some embodiments of the present disclosure. In some embodiments, the major components of the computer system 701 may comprise one or more CPUs 702, a memory subsystem 704, a terminal interface 712, a storage interface 714, an I/O (Input/Output) device interface 716, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other some embodiments the computer system 701 may alternatively be a single CPU system. Each CPU 702 may execute instructions stored in the memory subsystem 704 and may comprise one or more levels of on-board cache.

In some embodiments, the memory subsystem 704 may comprise a random-access semiconductor memory, storage device, or storage medium (either volatile or non-volatile) for storing data and programs. In some embodiments, the memory subsystem 704 may represent the entire virtual memory of the computer system 701, and may also include the virtual memory of other computer systems coupled to the computer system 701 or connected via a network. The memory subsystem 704 may be conceptually a single monolithic entity, but, in some embodiments, the memory subsystem 704 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 704 may contain elements for control and flow of memory used by the CPU 702. This may include a memory controller 705.

Although the memory bus 703 is shown in FIG. 7 as a single bus structure providing a direct communication path among the CPUs 702, the memory subsystem 704, and the I/O bus interface 710, the memory bus 703 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other some embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smart phone, mobile device, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to some embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various some embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various some embodiments of the present invention have been presented for purposes of illustration, but are not intended to be exhaustive or limited to the some embodiments disclosed. Many modifications and variations will be apparent to those of ordinary skill in the art without departing from the scope and spirit of the described some embodiments. The terminology used herein was chosen to best explain the principles of the some embodiments, the practical application or technical improvement over technologies found in the marketplace, or to enable others of ordinary skill in the art to understand the some embodiments disclosed herein.

What is claimed is:

1. A computer-implemented method for workload relocation based on security evaluation, the method comprising:
   detecting a security incident at a first location;
   evaluating a risk of the security incident;
   generating, for the first location, a first security score;
   generating, for a set of alternative locations, a set of security scores excluding the first security score;
   determining a second security score within the set of security scores is a best security score among a plurality of security scores, the plurality of security scores comprising the set of security scores and the first security score; and
   migrating a workload associated with the first location to a second location, wherein the second location is associated with the second security score.

2. The method of claim 1, wherein evaluating the risk of the security incident comprises:
   generating a first risk score for the security incident;
   ranking the first risk score among a set of risk scores associated with a set of security incidents; and
   determining the first risk score represents the greatest security risk.

3. The method of claim 2, wherein generating the first security score comprises:
   collecting a set of Common Vulnerability Exposure (CVE) data associated with the first location;
   comparing the set of CVE data to a set of asset data; and
   generating, based on the comparison, the first security score.

4. The method of claim 3, wherein generating the set of security scores comprises:
   collecting, for each location within the set of alternative locations, a set of CVE data;
   comparing, for each location within the set of alternative locations, the set of CVE data to the set of asset data; and
   generating, based on the comparison, the set of security scores.

5. The method of claim 4, further comprising:
   compiling a migration security log;
   auditing the migration security log;
   determining the migration security log meets a set of security criteria; and
   notifying a user of the migration security log and the workload migration.

6. The method of claim 4, further comprising:
   compiling a migration security log;
   auditing the migration security log;
   determining the migration security log fails a set of security criteria;
   canceling the workload migration; and
   notifying a user of the migration security log and the canceled workload migration.

7. The method of claim 5, wherein generating the first risk score for the security incident includes a perceived impact of the security incident.

8. The method of claim 7, wherein the perceived impact is determined using a neural network.

9. The method of claim 8, wherein generating the perceived impact includes adjusting a weight and a bias of one or more neural network edges.

10. The method of claim 9, wherein the method enables unilaterally provisioning computing capabilities in a cloud environment.

11. A system for workload relocation based on security evaluation, comprising:
    a memory with program instructions included thereon; and
    a processor in communication with the memory, wherein the program instructions cause the processor to:
      detect a security incident at a first location;
      evaluate a risk of the security incident;
      generate, for the first location, a first security score;
      generate, for a set of alternative locations, a set of security scores excluding the first security score;
      determine a second security score within the set of security scores is a best security score among a plurality of security scores, the plurality of security scores comprising the set of security scores and the first security score; and
      migrate a workload associated with the first location to a second location, wherein the second location is associated with the second security score.

12. The system of claim 11, wherein evaluating the risk of the security incident comprises:
    generating a first risk score for the security incident;
    ranking the first risk score among a set of risk scores associated with a set of security incidents; and
    determining the first risk score represents the greatest security risk.

13. The system of claim 12, wherein generating the first security score comprises:
    collecting a set of Common Vulnerability Exposure (CVE) data associated with the first location;
    comparing the set of CVE data to a set of asset data; and
    generating, based on the comparison, the first security score.

14. The system of claim 13, wherein generating the set of security scores comprises:
    collecting, for each location within the set of alternative locations, a set of CVE data;
    comparing, for each location within the set of alternative locations, the set of CVE data to the set of asset data; and
    generating, based on the comparison, the set of security scores.

15. The system of claim 13, wherein the program instructions further cause the processor to:

compile a migration security log;
audit the migration security log;
determine the migration security log meets a set of security criteria; and
notify a user of the migration security log and the workload migration.

16. A computer program product for workload relocation based on security evaluation, the computer program product comprising a computer readable storage medium having program instructions embodied therewith, the program instructions executable by a device to cause the device to:
    detect a security incident at a first location;
    evaluate a risk of the security incident;
    generate, for the first location, a first security score;
    generate, for a set of alternative locations, a set of security scores excluding the first security score;
    determine a second security score within the set of security scores is a best security score among a plurality of security scores, the plurality of security scores comprising the set of security scores and the first security score; and
    migrate a workload associated with the first location to a second location, wherein the second location is associated with the second security score.

17. The computer program product of claim 16, wherein evaluating the risk of the security incident comprises:
    generating a first risk score for the security incident;
    ranking the first risk score among a set of risk scores associated with a set of security incidents; and
    determining the first risk score represents the greatest security risk.

18. The computer program product of claim 17, wherein generating the first security score comprises:
    collecting a set of Common Vulnerability Exposure (CVE) data associated with the first location;
    comparing the set of CVE data to a set of asset data; and
    generating, based on the comparison, the first security score.

19. The computer program product of claim 18, wherein generating the set of security scores comprises:
    collecting, for each location within the set of alternative locations, a set of CVE data;
    comparing, for each location within the set of alternative locations, the set of CVE data to the set of asset data; and
    generating, based on the comparison, the set of security scores.

20. The computer program product of claim 18, wherein the program instructions further cause the device to:
    compile a migration security log;
    audit the migration security log;
    determine the migration security log meets a set of security criteria; and
    notify a user of the migration security log and the workload migration.

* * * * *